United States Patent [19]

Baumann et al.

[11] 4,335,434

[45] Jun. 15, 1982

[54] ELECTRONICALLY CONTROLLED FRANKING MACHINE

[75] Inventors: Kurt Baumann; Peter Kusche, both of Berlin; Reinhard Redecker, Bielefeld, all of Fed. Rep. of Germany

[73] Assignee: Postalia GmbH, Berlin, Fed. Rep. of Germany

[21] Appl. No.: 144,337

[22] Filed: Apr. 28, 1980

[30] Foreign Application Priority Data

Apr. 26, 1979 [DE] Fed. Rep. of Germany ....... 2916840

[51] Int. Cl.$^3$ ............................................ G06F 15/20

[52] U.S. Cl. ................................ 364/464; 235/61.9 A

[58] Field of Search ................. 364/464,466, 580, 200; 235/61.9 A, 900

[56] References Cited

U.S. PATENT DOCUMENTS

| | | | |
|---|---|---|---|
| 3,624,617 | 11/1971 | Putterman et al. | 361/92 X |
| 3,635,297 | 1/1972 | Salava | 364/464 X |
| 3,757,917 | 9/1973 | Waiwood et al. | 194/10 |
| 3,792,446 | 2/1974 | McFiggins et al. | 364/900 |
| 3,810,116 | 5/1974 | Proholfsky | 364/200 |
| 4,021,645 | 5/1977 | Saufferer et al. | 371/25 X |
| 4,024,380 | 5/1977 | Gunn | 177/5 X |
| 4,180,856 | 12/1979 | Ckeck, Jr. et al. | 364/466 |
| 4,251,874 | 2/1981 | Check, Jr. | 364/466 X |

*Primary Examiner*—Edward J. Wise

*Attorney, Agent, or Firm*—Herbert L. Lerner; Laurence A. Greenberg

[57] ABSTRACT

Electronic control for franking machines such as postage meters and stamping machines having a printing device, a postage value printing selection device, a total postal charge storage register and a settable subtracting value counter, including a microprocessor, a volatile main memory for storing data and non-volatilesemiconductor memories for storing data and the number of writing cycles performed, the memories being connected to the microprocessor, a line voltage power supply, supply capacitors disposed in the power supply, a switch controlled by the microprocessor for connecting the non-volatile memories to the supply capacitors of the power supply exclusively in the event of an interruption of the line voltage to cause the non-volatile memories to take over data stored in the main memory, and a register connected to one of the non-volatile memories for preventing the exceeding of a predetermined number of writing cycles of the one non-volatile memory after the power supply resumes.

6 Claims, 1 Drawing Figure

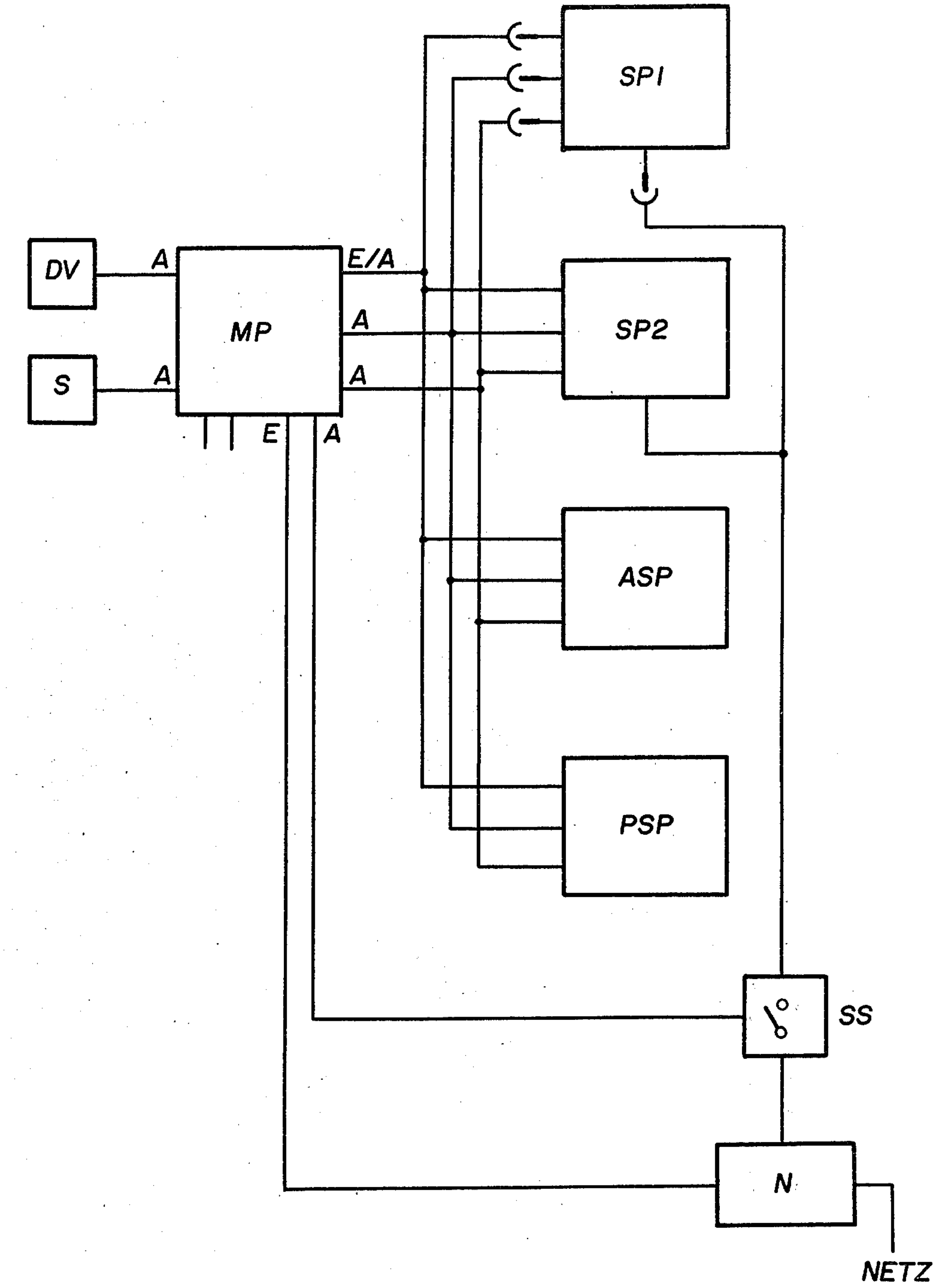
SP1
SP2
ASP
PSP
DV
S
MP
A
A
E/A
A
A
E
A
SS
N
NETZ

ELECTRONICALLY CONTROLLED FRANKING MACHINE

The invention relates to an electronically controlled franking machine, preferably a postage meter and stamping machine with a printing device, a postage value printing selection device, a total postage charge storage register, and a settable subtracting value counter; the control device of which comprises a processor, preferably a microprocessor, and associated semiconductor memories.

In electronically controlled postage meter and stamping machines with semiconductor storage for the number of all printing and setting operations as well as for the mechanical wear data and rate limits, it is required that, in the event of a line voltage failure, the last memory contents must be preserved. In addition, certain states of the control logic must be stored so that the commands or functions initiated prior to the line failure can be executed or continued when the line voltage returns. For this purpose, non-volatile semiconductor memories are used.

Known non-volatile semiconductor memories, however, have the disadvantage that they are unusable after about $10^6$ writing cycles. Furthermore, the number of reading cycles after a one-time writing cycle is limited, since a small voltage is continuously present at the control input of the memories. This voltage acts like a weak writing voltage, so that after about $10^{10}$ read operations, the memory content is no longer reliably recognizable. A further disadvantage is the limited storage time, which depends on the combination of the voltage amplitude and the pulse width of the data to be fed-in and in a normal temperature range without supply voltage is only in the order of $10^4$ hours.

Such a non-volatile memory can therefore not be used like a normal memory, since the limited number of writing cycles would be quickly reached.

It is accordingly an object of the invention to provide an electronically controlled franking machine which overcomes the hereinafore-mentioned disadvantages of the heretofore-known devices of this general type by suitable switching measures.

With the foregoing and other objects in view there is provided, in accordance with the invention, an electronic control for franking machines such as postage meters and stamping machines having a printing device, a postage value printing selection device, a total postal charge storage register and a settable subtracting value counter, comprising a microprocessor, a volatile main memory for storing data, and non-volatile semiconductor memories for storing data and the number of writing cycles performed, the memories being connected to the microprocessor, a line voltage power supply, supply capacitors disposed in the power supply, switch means controlled by the microprocessor for connecting the non-volatile memories to the supply capacitors of the power supply exclusively in the event of an interruption of the line voltage to cause the non-volatile memories to take over data stored in the main memory, and register means connected to one of the non-volatile memories for preventing the exceeding of a predetermined number of writing cycles of the one non-volatile memory after the power supply resumes.

In accordance with another feature of the invention, there are provided devices for releasing a signal after a given number of writing cycles of the non-volatile memories has been reached.

In accordance with a further feature of the invention, there are provided devices for releasing a print inhibit signal when the predetermined number of writing cycles is at least reached.

In accordance with an added feature of the invention, there are provided a clock signal generator disposed in the microprocessor for measuring uninterrupted data storage time, and devices for triggering an automatic cleaning and writing phase for refreshing the memory contents after a given interrupted storage time.

In accordance with an additional feature of the invention, the clock signal generator is restarted after each line interruption.

In accordance with a concomitant feature of the invention, there are provided devices controlled by the clock signal generator for periodically determining total postage charges.

Other features which are considered as characteristic for the invention are set forth in the appended claims.

Although the invention is illustrated and described herein as embodied in an electronically controlled franking machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a block diagram of an electronically controlled postage meter and stamping machine.

Referring now to the single FIGURE of the drawing, it is seen that several memories and a minicomputer, preferably a microprocessor MP, are used for controlling the postage indication and the value or denomination printing. The microprocessor disclosed in German Published, Non-Prosecuted Application DEOS No. 30 40 549, corresponding to U.S. patent application Ser. No. 089,413 is one of several such available devices usable as the microprocessor MP. In the block diagram, the indicator and denomination printing devices are controlled through the undesignated terminals of the microprocessor MP. These are not shown since they are not important for the invention. In addition to a main memory ASP and a program memory PSP, two non-volatile semiconductor memories SP1, SP2, preferably MNOS memories, are used. The first of these is an exchangeable memory SP1 which serves, for instance, for storing the monthly postage total, for storing the postal rates, for containing customer, country, or postal-related program routines, or it can be used as a variable data storage for automated mail lines. If postal rates change, it is easily exchanged. The second, permanently assigned memory SP2 serves for storing the total postage and the remaining postage total etc., as well as the number of times the line was connected and thereby the number of writing cycles of both non-volatile memories SP1 and SP2.

The volatile main memory ASP, preferably a RAM, stores the actual state of the control logic and also totals the operating time of the postage meter and stamping machine. The main memory ASP continues to be supplied with voltage even after the equipment is switched off, as long as the connection with the line voltage is preserved.

A switch SS for the power supply is controlled by the processor MP and is associated with the non-volatile semiconductor memories SP1, SP2. In order to preclude the possible $10^6$ writing cycles of the non-volatile memories and to nevertheless ensure continuous readiness for storage of the memories during the entire life of the equipment, a command to store is given only if an interruption of the line voltage occurs. After the power plug of the equipment is pulled or after some other interruption, a line failure signal is generated, for instance by the dropping voltage at the output of the power supply N, which cuases the processor MP to actuate the switch SS. Storage capacitors provided in the power supply N then supply the energy required for transferring the data stored in the main memory ASP into the non-volatile memories SP1 and SP2, respectively.

In addition, the second, permanently assigned memory SP2 has a special register. The latter is loaded after every line return with the value $n+1 \rightarrow n$; l.e., the then applicable entered number of the performed writing cycles has risen by the value 1 and now forms the new reference point n for a signal S which is indicated, for instance, after $n=9\times10^5$ writing cycles. This signal S constitutes, for instance, a call for servicing. When the equipment is checked, the register content is indicated and the memory is exchanged if necessary. If servicing does not take place, a print inhibit DV coupled to a mechanical locking device is additionally triggered when about $10^6$ writing cycles are reached.

The processor MP contains a quartz-controlled timer which generates a certain clock rate. This time base allows the measurement of periods of time, such as after an uninterrupted storage time of say one year, a clear-and-write phase is automatically provided to refresh the memory contents. In the process, the stored data of the time measurement are simultaneously cleared and set to the starting value, as also occurs after every line failure when the line voltage returns.

The time measurement finally makes it possible to determine the monthly charges and number of prints, etc., as well as the determination of the charges and the indication of the last n number of months.

There are claimed:

1. Electronic control for franking machines such as postage meters and stamping machines having a printing device, a postage value printing selection device, a total postal charge storage register and a settable subtracting value counter, comprising a microprocessor, a volatile main memory for storing data, and non-volatile semiconductor memories for storing data and the number of writing cycles performed, said memories being connected to said microprocessor, a line voltage power supply, supply capacitors disposed in said power supply, switch means controlled by said microprocessor for connecting said non-volatile memories to said supply capacitors of said power supply exclusively in the event of an interruption of the line voltage to cause said non-volatile memories to take over data stored in said main memory, and register means connected to one of said non-volatile memories for preventing the exceeding of a predetermined number of writing cycles of said one non-volatile memory after the power supply resumes.

2. Electronic control for franking machines according to claim 1, including means for releasing a signal after a given number of writing cycles of said non-volatile memories has been reached.

3. Electronic control for franking machines according to claim 1, including means for releasing a print inhibit signal when said predetermined number of writing cycles is at least reached.

4. Electronic control for franking machines according to claim 1, including a clock signal generator disposed in said microprocessor for measuring uninterrupted data storage time, and means for triggering an automatic clearing and writing phase for refreshing the memory contents after a given interrupted storage time.

5. Electronic control for franking machines according to claim 4, wherein said clock signal generator is restarted after each line interruption.

6. Electronic control for franking machines according to claim 5, including means controlled by said clock signal generator for periodically determining total postage charges.

* * * * *